MAGNETIC DOMAIN PROPAGATION ARRANGEMENT

Filed Oct. 28, 1968 2 Sheets-Sheet 1

INVENTORS A. H. BOBECK
U. F. GIANOLA
BY Herbert M. Shapiro
ATTORNEY

United States Patent Office 3,541,534

Patented Nov. 17, 1970

3,541,534
MAGNETIC DOMAIN PROPAGATION ARRANGEMENT

Andrew H. Bobeck, Chatham, and Umberto F. Gianola, Florham Park, N.J., assignors to Bell Telephone Laboratories, Incorporated, Murray Hill and Berkeley Heights, N.J., a corporation of New York Filed Oct. 28, 1968, Ser. No. 771,157
Int. Cl. G11c *11/14, 19/00*
U.S. Cl. 340—174 5 Claims

ABSTRACT OF THE DISCLOSURE

A propagation channel for single wall domains is defined in a sheet of magnetic material by aligned chevron-shaped overlay patterns. A domain is propagated between the apex of each chevron and a first or second terminal position of that chevron depending on whether a zero or a one is stored. The position to which a domain in one chevron can be moved is determined by the terminal position occupied by a domain in the next preceding chevron. In this manner, the interaction between neighboring domains is propagated rather than the domain itself.

FIELD OF THE INVENTION

This invention relates to data processing arrangements and, more particularly, to such arrangements employing magnetic media in which single wall domains can be propagated.

BACKGROUND OF THE INVENTION

A single wall domain is a magnetic domain bounded by a domain wall which closes on itself and has a geometry independent of the boundary of the magnetic sheet in which it is moved. The domain conveniently assumes the shape of a circle (viz., cylinder) in the plane of the sheet and has a stable diameter determined by the material parameters. A bias field of a polarity to contract domains insures movement of domains as stable entities. The Bell System Technical Journal, volume XLVI, No. 8, October 1967, at pages 1901 et seq., describes the propagation of single wall domains in a propagation medium such as a sheet of a rare earth orthoferrite.

The movement of single wall domains is accomplished normally by generating consecutively offset localized fields (actually field gradients) of a polarity to attract domains. In this manner, a domain follows the consecutive attracting fields from input to output positions in the sheet. A three-phase propagation operation provides the directionality along a selected propagation path in a manner consistent with the teaching of the prior art.

The propagation wiring pattern assumes a geometry dictated by the material in which the domains are moved. A typical material is a rare earth orthoferrite such as lutecium orthoferrite. These materials have preferred directions of magnetization substantially normal to the plane of the sheet. If we adopt the convention that a sheet is saturated magnetically in a negative direction along an axis normal to the plane of the sheet, the magnetization of a single wall domain is in the other or positive direction along that axis. The domain then may be represented as an encircled plus sign where the circle represents the domain wall thereabout. The propagation wiring pattern for generating the localized fields is conveniently in the form of consecutively offset closed loops to correspond to the circular geometry of the domain.

It has been found to be beneficial that the sheet in which single wall domains are moved be of a single crystal in order to avoid problems at interfaces between crystals as a domain is moved from an input position to an output position. In accordance with the present invention an interaction between domains in next adjacent positions is propagated rather than the domain itself thus obviating such problems.

It is known that a magnetically soft overlay on a sheet of magnetic material in which single wall domains can be moved exhibits magnetic poles which attract domains in response to a magnetic field in the plane of the sheet. Such a field is called a transverse field because it is transverse to the preferred direction of magnetization and has only negligible direct effect on domains. Copending application Ser. No. 732,705, filed May 28, 1968 for A. H. Bobeck, describes a magnetically soft overlay pattern which exhibits moving magnetic poles in response to a transverse field rotating in the plane of the sheet. Domains follow the attracting poles from input to output positions.

It is also known that single wall domains are of like charge and repel one another like like-charged pith balls. Copending application Ser. No. 579,931, filed Sept. 16, 1966 for A. H. Bobeck, U. F. Gianola, R. C. Sherwood, and W. Shockley (now Pat. 3,460,116), discloses logic operations in which such an interaction between single wall domains is utilized.

BRIEF DESCRIPTION OF THE INVENTION

In accordance with the present invention, the interaction between single wall domains in two next adjacent bit locations is employed to position the domain in one of the bit locations in a manner to represent a binary one or a binary zero depending on the position of the domain occupying an information-representing position in the other bit location. In an illustrative embodiment of this invention, magnetically soft overlays of a chevron design are aligned between input and output positions in a sheet of magnetic material in which single wall domains can be moved. Adjacent chevrons are on opposite faces of the magnetic sheet. Moreover, each chevron has an apex position and first and second extreme positions defining a single bit location. A transverse field generated in the sheet urges a first domain in each even-numbered location towards associated extreme positions. Second domains in extreme positions in odd-numbered locations are concurrently moved to corresponding apex positions. But before moving, each second domain in a first extreme position of an odd-numbered location acts to repel the domain in the next subsequent even-numbered location to a second extreme position. On the other hand, if a second domain in an odd-numbered location occupies a second extreme position, the first domain in the next subsequent location is driven to the first extreme position there when a next transverse field is generated.

DETAILED DESCRIPTION

Figure 1:
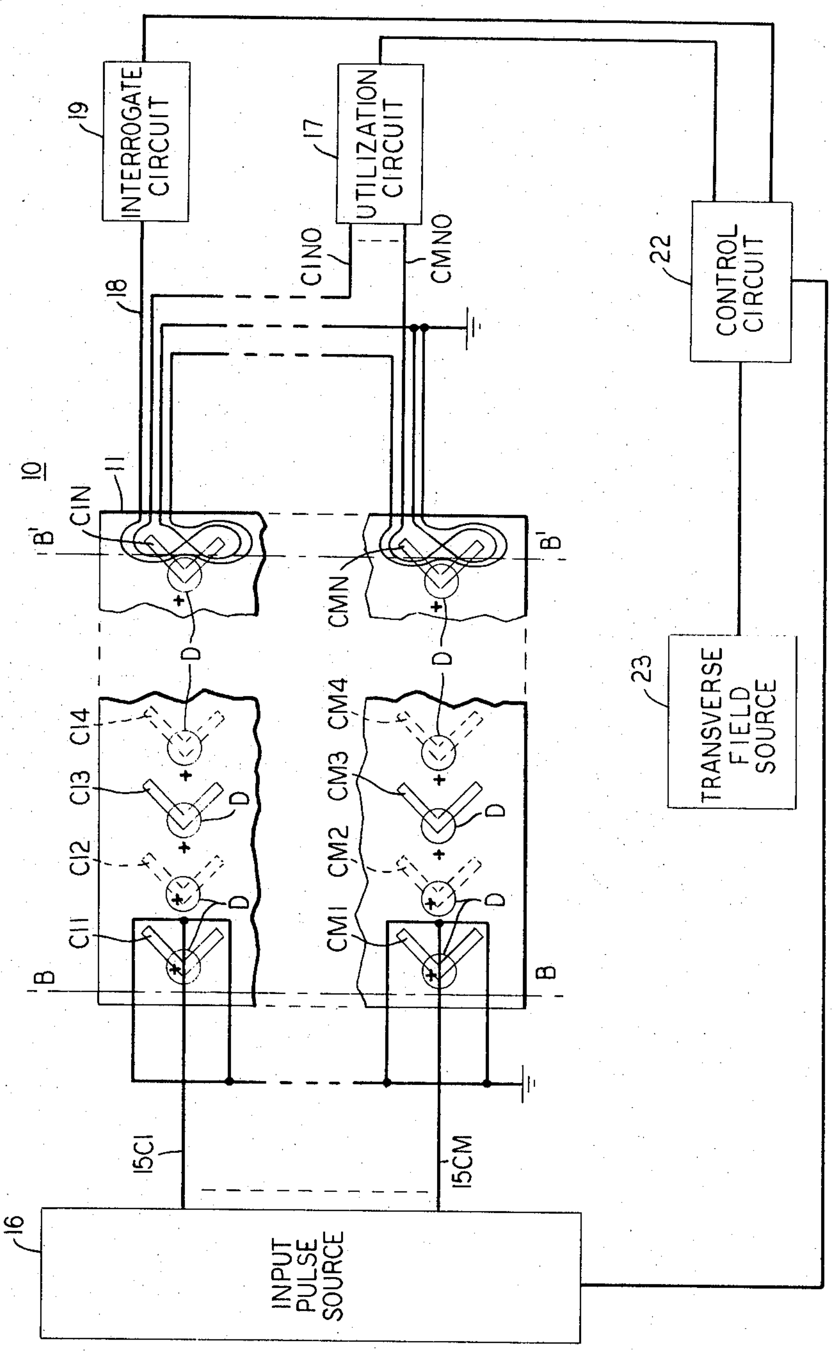
FIG. 1 is a schematic representation of an arrangement in accordance with this invention.

FIG. 1 shows an arrangement 10 in accordance with this invention. The arrangement includes a sheet 11 of magnetic mateial in which single wall domains can be moved. Magnetically soft overlay patterns of chevrons C11, C12, C13 . . . C1N, CM1, CM2, CM3 . . . CMN are shown adjacent sheet 11 along horizontal axes as viewed. The even-numbered chevrons are shown broken to indicate their position on the underside of sheet 11.

Single wall domains are provided initially in sheet 11, by any one of a number of suitable means, and remain permanently in prescribed bit locations (viz., associated with prescribed chevrons) once provided. One simple means is a movable magnetically soft overlay pattern with which single wall domains can be generated in response to a rotating transverse field One suitable source, shown in copending application Ser. No. 756,210, filed Aug 29, 1968 for A. J. Perneski, comprises a permalloy disk (not shown) about the periphery of which a domain moves in response to a rotating transverse field. The field is augmented once during each rotation to permit the domain to latch onto an associated permalloy overlay. As the field rotates further, the domain divides into two. Domains so generated can be made to fill sheet 11, positioning themselves in an array by magnetostatic forces modified in a well understood manner by the presence of the chevron overlay pattern which can be designed to correspond to the ultimate domain array.

Figure 2:
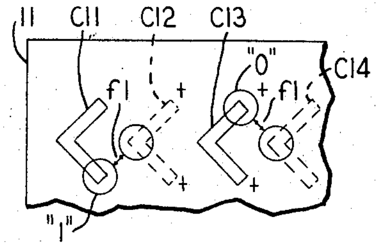
FIGS. 2, 3, 4A and 4B, and 5 are schematic representations of portions of the arrangement of FIG. 1 showing the magnetic conditions therein during operation.

The initial position for domains is at the apex (or rest position) of each chevron, as shown in FIG. 1. An information-representing position for a domain in each location is at the extreme position of either leg of the chevron. For illustration, we will assume that a domain represents a binary one when it is in a lower (or first) extreme position of a chevron and a binary zero when it is in an upper (or second) extreme position as shown in FIG. 2. Since domains are moved herein by magnetic pole concentrations which attract the domains, those concentrations are represented hereinafter as plus or minus signs and a domain is represented as a circle without the encompassed plus sign in order to avoid ambiguities.

In put information is introduced into a channel of FIG. 1 from the left as viewed. Input conductors, 15C1 . . . 15CM, couple the correspondingly designated chevrons to the left of associated channels. The illustrative manner of coupling is to drive a domain at an apex of the coupled chevron to the upper or lower extreme position there depending on the polarity of a pulse applied to the conductor when terminated in the presence of a transverse field which provides attracting poles at each extreme position. Therefore, conductor 15C1, for example, couples the legs of chevron C11 in opposite senses, a negative pulse therein causing a field directed away from the viewer in the top loop of conductor 15C1 and toward the viewer in the lower loop. In response to the pulse, the domain associated with chevron C11 in FIG. 1 moves downward to maximize flux closure through the overlay in the loop where domain growth is fostered. A transverse field of a polarity to generate negative poles at both the upper and lower extreme positions and positive poles at the apex of chevron C11 causes the movement of the domain to the lower extreme position. The storage of a binary one results as shown in FIG. 2.

On the other hand, if a positive pulse were applied, the domain associated with chevron C11 moves into the upper loop. A similar transverse field drives the domain to the upper terminal position resulting in the storage of a binary zero. A domain in the binary zero position is shown at chevron C13 in FIG. 2. Conveniently, input conductor 15C1 is positioned between sheet 11 and chevron C11. In this instance, the latter acts as a keeper becoming strongly poled to insure the desired domain movement. The input conductors are connected between an input pulse source 16 and ground.

The propagation of information, in contradistinction to the propagation of domains, is explained with reference to FIGS. 2–5. The fields which cause domain propagation are shown in FIGS. 6–9. Consider a binary one stored at chevron C11 and a binary zero stored at chevron C13 as shown in FIG. 2. A transverse field H, directed to the right as shown by the arrow H in FIG. 6, generates positive pole concentrations of equal strength at the extreme of each upper and lower leg in representative chevrons C12 and C14. It is noted that chevrons C12 and C14 are shown broken to indicate their position on the underside of sheet 11. In accordance with the adopted convention, positive poles on an overlay so positioned attract domains.

But the attraction to the two extreme positions in each chevron due to the applied field is the same. Additional interaction forces between the domains at chevrons C12 and C14 and the domains at chevrons C11 and C13, respectively, on the other hand, insure that the domains at the former move to selected information bearing positions. The interaction force is a force of repulsion as stated hereinbefore and is indicated in FIG. 2 by the double-headed arrows *f*1. For the domain distribution shown in FIG. 2, the interaction forces alone cause movement of domains to the positions shown in FIG. 3. This additional force repels the domain at chevron C12 upward and the domain at chevron C14 downward, to positions shown in FIG. 3, prior to the provision of transverse field H of FIG. 6. The transverse field is then applied to move domains to the positions shown in FIG. 4A. The field thus can be seen to serve as an enabling field for domain movement to the right as viewed; the interaction forces modify the domain positions and thus determine whether the domain moves upward or downward from the apex of the associated chevron when that enabling field is generated.

Figure 6:
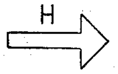
FIGS. 6, 7, 8, and 9 are diagrams of transverse magnetic fields generated during the operation of the arrangement of FIG. 1 to generate the magnetic conditions shown in FIGS. 2–5.
Figure 3:
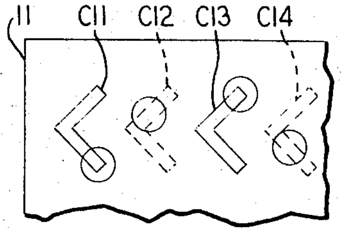
Figure 7:
Figure 4A:
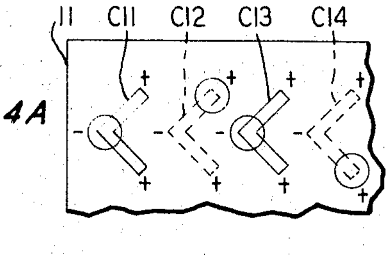

That same field, of course, simultaneously generates attracting negative poles at the apex of each chevron on the top surface of sheet 11. Consequently, the domains in extreme positions of odd-numbered chevrons as shown in FIG. 2 move back to corresponding apex positions at the same time the domains at even-numbered chevrons are moved to extreme positions. The domain disposition at the odd-numbered chevrons due to the generation of the field of FIG. 6 is also shown in FIG. 4A. Field H is now terminated as indicated by the dot also designated H in FIG. 7 and the domains are again repositioned by the interaction forces as shown by the arrow *f*1 in FIG. 4B.

Figure 4B:
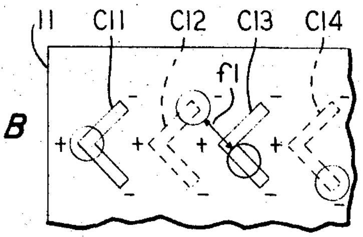
Figure 8:
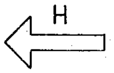
Figure 5:
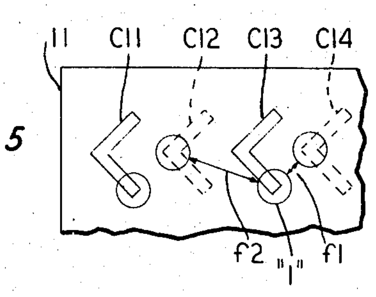

FIG. 8 indicates a next applied field H to be directed to the left as viewed. All the terminal positions of the chevrons of FIG. 4B are thus driven negative and all the apex positions are driven positive. In response, domains associated with the odd-numbered chevrons move to the terminal positions while domains at even-numbered chevrons move to associated apex positions. The disposition of the domains as the field of FIG. 8 terminates is shown in FIG. 5. The domains will of course be displaced in a manner similar to that shown in FIGS. 3 and 4B when that field is terminated.

It is assumed for illustrative purposes that conductor 15C1 of FIG. 1 is pulsed synchronously with the applied transverse fields to provide the disposition of the domain at chevron C11 shown in FIG. 5. Of course, an end of input data at this time would leave the domain at chevron C11 in an ambiguous extreme position which can be accounted for in a manner entirely consistent with prior art teaching.

Figure 9:
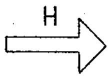

A comparison of FIGS. 2 and 5 shows that binary information is moved, for example, from chevron C11 to chevron C13 by an alternation of the direction of a transverse field along the axis along which the chevrons are aligned. The net cycle is initiated by generating the field again in the initial direction of FIG. 6 as shown in FIG. 9. Continued alternations of the transverse field advance information (not domains) to an output position in each channel for overlays of the illustrative configuration.

A convenient implementation for detecting information at an output position is shown in FIG. 1. Output conductors, C1NO . . . CMNO, couple the extreme positions of correspondingly designated chevrons at the extreme right of associated channels as viewed in FIG. 1. The coupling sense is opposite for the terminal positions at each channel and the conductor is conveniently of a figure 8 configuration to this end. The output conductors are connected between a utilization circuit 17 and ground.

An additional conductor 18 couples both terminal positions at the output position in each channel as shown in FIG. 1. Conductor 18 is connected between an interrogate circuit 19 and ground. Each time source 16 pulses an input conductor, circuit 19 pulses conductor 18 in a manner to contract domains in extreme positions in each output position. The polarity of the pulse in the output conductors indicates the extreme position occupied in each output position. Source 16 and circuits 17 and 19 are connected to control circuit 22 to provide suitable control and synchronization.

The various sources, domain detectors, and circuits herein may be any such elements capable of operating in accordance with this invention. The poles for effecting domain propagation are generated in the overlays, for example, by a transverse field impressed by a source 23 under the control of control circuit 22. A suitable source may comprise a pair of coils (not shown), oriented orthogonally with respect to sheet 11 along imaginary lines B and B′ and pulsed in a manner to generate the appropriate fields.

It must be appreciated that next adjacent chevrons are spaced apart such that the forces between adjacent domains is exerted in a manner to propagate domains in a desired direction. For movement of domains to the right as viewed in the drawing, the chevrons are arranged so that the force *f*1 as indicated by the double-headed arrow in FIG. 5 is large compared to the force *f*2 also indicated by a double-headed arrow in that figure.

For a sheet of $TbFeO_3$ orthoferrite 50 microns thick, chevrons 5 x 1 mil on a side by 5,000 angstrom units thick spaced 10 mils apart are suitable for the propagation of interactions between domains 1.5 mils in diameter in response to fields (H) of ±15 oersteds at a repetition rate of 5 kc. A bias field of 40 oersteds is typical. A decrease in the domain size of an order of magnitude permits a reduction of the other numbers by a corresponding amount. Considerably higher repetition rates are realizable.

What has been described is considered only illustrative of the principles of this invention. Consequently, various modifications in accordance with those principles can be devised by one skilled in the art without departing from the spirit and scope of this invention.

What is claimed is:

1. A combination comprising a sheet of magnetic material in which single wall domains can be moved, means for defining a plurality of locations for single wall domains in said sheet between input and associated output positions, said locations comprising a succession of spaced apart magnetically soft overlay patterns each having a rest and first and second terminal positions, each of the terminal positions of each location being positioned so that there is an interaction between a domain occupying a terminal position and a domain occupying a rest position in the next adjacent location, and means for moving domains between associated rest and terminal positions in a manner such that said interaction determines the terminal position to which domains are moved in consecutive locations in said channel.

2. A combination in accordance with claim 1 also including means for determining selectively the terminal positions to which domains are moved in said input positions and means for determining the positions occupied by domains in said output positions.

3. A combination in accordance with claim 2 wherein said means for defining a plurality of locations comprises overlay patterns of magnetically soft material aligned along axes between input and associated output positions.

4. A combination in accordance with claim 3 wherein said overlay patterns comprise chevrons odd-numbered ones of which are on a first surface of said sheet and even-numbered ones of which are on a second surface of said sheet along each axis, each of said chevrons defining a rest position at its apex and first and second terminal positions at the extremes of its legs.

5. A combination in accordance with claim 4 wherein means moving domains comprises means for generating a transverse field in said sheet alternately in first and second directions along said axes.

References Cited

UNITED STATES PATENTS 3,438,006 4/1969 Spain -------------- 340—174

JAMES W. MOFFITT, Primary Examiner